(12) United States Patent
Yu et al.

(10) Patent No.: US 12,124,507 B2
(45) Date of Patent: Oct. 22, 2024

(54) SYSTEMS AND METHODS FOR DETECTING NON-NARRATIVE REGIONS OF TEXTS

(71) Applicant: Spotify AB, Stockholm (SE)

(72) Inventors: Yongze Yu, Quincy, MA (US); Sravana Kukati Reddy, Somerville, MA (US); Jussi Jerker Karlgren, Stockholm (SE); Rosemary Ellen Jones, Cambridge, MA (US)

(73) Assignee: Spotify AB, Stockholm (SE)

( * ) Notice: Subject to any disclaimer, the term of this patent is extended or adjusted under 35 U.S.C. 154(b) by 282 days.

(21) Appl. No.: 17/700,290

(22) Filed: Mar. 21, 2022

(65) Prior Publication Data

US 2022/0300555 A1 Sep. 22, 2022

Related U.S. Application Data

(60) Provisional application No. 63/164,507, filed on Mar. 22, 2021.

(51) Int. Cl.
*G06F 16/65* (2019.01)
*G06F 16/635* (2019.01)
*G06F 16/683* (2019.01)
*G06F 40/169* (2020.01)
*G06F 40/194* (2020.01)

(52) U.S. Cl.
CPC .......... *G06F 16/685* (2019.01); *G06F 16/635* (2019.01); *G06F 16/65* (2019.01); *G06F 40/169* (2020.01); *G06F 40/194* (2020.01)

(58) Field of Classification Search
CPC .... G06F 16/685; G06F 16/683; G06F 16/635; G06F 16/65; G06F 40/169; G06F 40/194; G06F 40/166; G06F 40/216; G06F 40/30; G06F 40/253; G10L 15/00
See application file for complete search history.

(56) References Cited

U.S. PATENT DOCUMENTS

| | | | |
|---|---|---|---|
| 10,380,490 B1 * | 8/2019 | Somasundaran | G06F 40/253 |
| 2006/0161537 A1 * | 7/2006 | Amitay | G06F 40/284 |
| 2019/0384826 A1 * | 12/2019 | Doggett | G06F 16/435 |

OTHER PUBLICATIONS

Bhosale, Detecting Promotional Content in Wikipedia, Proceedings of the 2013 Conference on Empirical Methods in Natural Language Processing, pp. 1851-1857, Seattle, Washington, Oct. 18-21, 2013.
(Continued)

*Primary Examiner* — Huyen X Vo
(74) *Attorney, Agent, or Firm* — Morgan, Lewis & Bockius LLP

(57) ABSTRACT

A method includes retrieving a text from a database. The text corresponds to audio from a media content item that is provided by a media providing service, and the text includes a plurality of segments. The method also includes assigning a score for each segment in the text by applying the text to a trained computational model. The score corresponds to a predicted relevance of the respective segment to a narrative of the media content item. The method further includes identifying a non-narrative segment within the text using the assigned scores.

20 Claims, 14 Drawing Sheets

(56) References Cited

OTHER PUBLICATIONS

Chuang, Speechbert: Cross-Modal Pre-Trained Language Model for End-to-Enc Spoken Question Answering, College of Electrical Engineering and Computer Science, National Taiwan University, arXiv:1910.11559v1 {cs.CL] Oct. 25, 2019. 5 pgs.
Clifton, The Spotify Podcast Dataset, arXiv:2004.04270v3 {cs.CL] Dec. 5, 2020, 4 pgs.
Cohan, Pretrained Language Models for Sequential Sentence Classification, Proceedings of the 2019 Conference on Empirical Methods in Natural Language Processing and the 9th International Conference on Natural Language Processing, pp. 3693-3699, Hong Kong, China, Nov. 3-7, 2019.
Conejero, TV Advertisement Detection and Clustering Bases on Acoustic Information, IEEE, 2008 International Conference, Vienna, Austria, Dec. 20-12, 2008, 7 pgs.
Dai, Named Entity Recognition Using BERT BiLSTM CRF for Chinese Electronic Health Records, IEEE, 2019 12th International Conference, Suzhou, China, Oct. 19-21, 2019, 7 pgs.
Devlin, Bert: Pre-Training of Deet Bidirectional Transformers for Language Understanding, Proceedings of NAACL-HLT 2019, pp. 4171-4186, Minneapolis, Minnesota, Jun. 2-7, 2019.
Duan, Segmentation, Categorization and Identification of Commercial Clips from TV Streams Using Multimodal Analysis, Proceedings of the 14th ACM International Conference on Multimedia, Oct. 2006, pp. 201-210.
Einstein, Reading Between the Lines: The Rise of Native Advertising and the FTC's Inability to Regulate It, 2015, Brooklyn Journal of Corporate, Financial & Commercial Law, vol. 10, Issue 1, SYMPOSIUM: The Treatment of Financial Contracts in Bankruptcy and Bank Resolution, 25 pgs.
Hermann, Teaching Machines to Read and Comprehend, Paper, NIPS 2015, 9 pgs.
Huang, Measuring Consumer Sensitivity to Audio Advertising: A Field Experiment on Pandora Internet Radio, Apr. 21, 2018, Electronic copy available at: https://ssrn.com/abstractact=3166676, 20 pgs.
Hulton, Podcasting Embraces Native Advertising, DIGIDAY, Aug. 6, 2015, https://digiday.com/media/podcasting-native-advertising/. 5 pgs.
Kohlschutter, Boilerplate Detection Using Shallow Text Features, *WSDM'10*, Feb. 4-6, 2010, New York City, New York, 10 pgs.
Lewis, Bart: Denoising Sequence-to-Sequence Pre-training for Natural Language Generation, Translation and Comprehension, Proceedings of the 58th Annual Meeting of the Association for Computational Linguistics, pp. 7871-7880, Jul. 5-10, 2020.
Lienhart, On the Detection and Recognition of Television Commercials, IEEE, Proceedings of IEEE International Conference on Multimedia Computing and Systems, Jun. 3-6, 1997, Ottawa, ON, Canada, 4 pgs.
Lin, Enhanced Bert-Based Ranking Models for Spoken Document Retrieval, IEEE, 2019 IEEE Automatic Speech Recognition and Understanding Workshop (ASRU), Dec. 14-18, 2019, 4 pgs.
Melamed, Automatic Detection of Audio Advertisements, Proceedings Interspeech 2009, ISCA Archive, 2 pgs.
Nguyen, Efficient Advertisement Discovery for Audio Podcast Content Using Candidate Segmentation, Hindawi Publishing Corporation, EURASIP Journal on Audio, Speech and Music Processing, vol. 2010, Article ID 572571, 12 pgs.
Vedula, Multimodal Content Analysis for Effective Advertisements on YouTube, Department of Computer Science, University of Miami, arXiv: 1709.03946v1 [cs.AI] Sep. 12, 2017, 11 pgs.
Virtanen, SciPy 1.0: Fundamental Algorithms for Scientific Computing in Python, Nature Methods, vol. 17, Mar. 2020, www.nature. com/naturemethods, 15 pgs.
Zheng, A Baseline Analysis for Podcast Abstractive Summarization, https://github.com/chz816/podcast-summarization-baseline/ arXiv. 2008.10648v2[cs.CL] Aug. 26, 2020, 4 pgs.

* cited by examiner

Text 470

It was a splendid population - for all the slow, sleepy, sluggish-brained sloths stayed at home - you never find that sort of people among pioneers - you cannot build pioneers out of that sort of material. It was that population that gave to California a name for getting up astounding enterprises and rushing them through with a magnificent dash and daring and a recklessness of cost or consequences, which she bears unto this day - and when she projects a new surprise the grave world smiles as usual and says, "Well, that is California all over."

*Before we continue to see made California the way it is today, we bring you a musical segment featuring a new single from Greg and the Cat Pack. Greg and the Cat Pack is a hot new band from Nashville. They are currently in New York kicking off the start of the their debut tour.* — 474

Clean Text 472

It was a splendid population - for all the slow, sleepy, sluggish-brained sloths stayed at home - you never find that sort of people among pioneers - you cannot build pioneers out of that sort of material. It was that population that gave to California a name for getting up astounding enterprises and rushing them through with a magnificent dash and daring and a recklessness of cost or consequences, which she bears unto this day - and when she projects a new surprise the grave world smiles as usual and says, "Well, that is California all over."

Figure 4F

Media Content Item Description 476

Between the years of 1861 and 1867, Mark Twain traveled through the wild west. His journeys were memorialized in his semi-autobiographical, semi-satirical work "Roughing It." This podcast discusses Twain's work, his description of the pioneers with their astounding enterprises, magnificent dash and daring and recklessness of cost or consequences.

┌─────────────────────────────────────────────────────────────────┐
│ 610 Retrieve a text from a database. The text corresponds to audio from a │
│ media content item that is provided by a media providing service, and the text │
│ includes a plurality of segments. │
└─────────────────────────────────────────────────────────────────┘
┌─────────────────────────────────────────────────────────────────┐
│ 620 Assign a score for each segment in the text by applying the text to a │
│ trained computational model. The score corresponds to a predicted relevance │
│ of the respective segment to a narrative of the media content item. │
│ ┌─────────────────────────────────────────────────────────────┐ │
│ │ 621 The trained computational model is trained on a plurality of │ │
│ │ annotated texts. Each of the annotated text in the plurality of annotated │ │
│ │ texts includes text corresponding to audio from a media content item of a │ │
│ │ plurality of media content items and a plurality of annotations. │ │
│ │ ┌───────────────────────────────────────────────────────┐ │ │
│ │ │ 622 Each annotated text of the plurality of annotated text includes │ │ │
│ │ │ an annotation for each segment in the text corresponding to audio │ │ │
│ │ │ from a media content item of the plurality of media content items. │ │ │
│ │ └───────────────────────────────────────────────────────┘ │ │
│ └─────────────────────────────────────────────────────────────┘ │
│ ┌─────────────────────────────────────────────────────────────┐ │
│ │ 623 Generate a label for each segment in the respective annotated text │ │
│ │ based on at least a portion of the plurality of annotations. │ │
│ └─────────────────────────────────────────────────────────────┘ │
│ ┌─────────────────────────────────────────────────────────────┐ │
│ │ 624 Assigning a score for a segment in the text includes analyzing │ │
│ │ content of the segment. │ │
│ └─────────────────────────────────────────────────────────────┘ │
│ ┌─────────────────────────────────────────────────────────────┐ │
│ │ 625 Assigning a score for a segment in the text includes analyzing │ │
│ │ content of the segment and content of a segment preceding the │ │
│ │ segment. │ │
│ └─────────────────────────────────────────────────────────────┘ │
└─────────────────────────────────────────────────────────────────┘

┌─────────────────────────────────────────────────────────────────┐
│ 630 Identify a non-narrative segment from the text using the assigned scores. │
└─────────────────────────────────────────────────────────────────┘

Figure 6A

SYSTEMS AND METHODS FOR DETECTING NON-NARRATIVE REGIONS OF TEXTS

RELATED APPLICATIONS

This application claims priority to U.S. Provisional App. No. 63/164,507, filed Mar. 22, 2021, which is hereby incorporated by reference in its entirety.

TECHNICAL FIELD

The disclosed embodiments relate generally to detecting non-narrative regions of texts, and, in particular, to using machine learning to detect non-narrative regions of texts.

BACKGROUND

Access to electronic media, such as music and video content, has expanded dramatically over time. As a departure from physical media, media content providers stream media to electronic devices across wireless networks, improving the convenience with which users can digest and experience such content.

SUMMARY

There is a need for systems and methods to provide information that is relevant and accurate regarding a narrative of a media content item (e.g., topical to the media content item), such as an accurate description (e.g., summary, show notes) of the media content item. Conventionally, information regarding media content items are provided from a producer or author of the media content item. However, information received from the producer or author regarding the media content item may contain additional information that is not part of a narrative of the media content item.

Some embodiments described herein offer a technical improvement by detecting (e.g., identifying) non-narrative content in text (such as a description, summary, transcript, or show note) corresponding to (e.g., associated with) a media content item. To do so, the systems and methods described herein use a trained computational model to identify segments in a text (that is associated with a media content item) that includes information that is not part of the narrative of the media content item. The systems and methods generate a clean text that does not include the identified non-narrative segments and provide the clean text to be stored by the media providing service. The clean text may be provided to users (e.g., subscribers, members) of the media providing service and/or may be used by the media providing service to generate recommendations. Thus, the media providing service can provide and/or use clean text that includes only narrative content media content item (e.g., does not include information that is not part of the narrative of the media content item). In some embodiments, the clean text consists of information that is topical and/or relevant to the narrative of the media content item. In some embodiments, the clean text omits (e.g., does not include) non-narrative segments (e.g., segments that are not part of the media content item's narrative).

To that end, in accordance with some embodiments, a method includes retrieving a text from a database. The text corresponds to audio from a media content item that is provided by a media providing service, and the text includes a plurality of segments (e.g., sentences). The method also includes assigning a score for each segment in the text by applying the text to a trained computational model. The score corresponds to a predicted relevance of the respective segment to a narrative of the media content item. The method further includes identifying a non-narrative segment within the text using the assigned scores.

In some embodiments, the method is performed at an electronic device that is associated with the media providing service. The electronic device has one or more processors and memory storing instructions for execution by the one or more processors.

In accordance with some embodiments, a computer system that is associated with a media providing service includes one or more processors and memory storing one or more programs configured to be executed by the one or more processors. The one or more programs include instructions for retrieving a text from a database. The text corresponds to audio from a media content item that is provided by a media providing service, and the text includes a plurality of segments (e.g., sentences). The one or more programs also include instructions for assigning a score for each segment in the text by applying the text to a trained computational model. The score corresponds to a predicted relevance of the respective segment to a narrative of the media content item. The one or more programs further include instructions for identifying a non-narrative segment within the text using the assigned scores.

In accordance with some embodiments, a computer-readable storage medium has stored therein instructions that, when executed by a server system that is associated with a media providing service, cause the server system to retrieve a text from a database. The text corresponds to audio from a media content item that is provided by a media providing service, and the text includes a plurality of segments (e.g., sentences). The instructions also cause the server system to assign a score for each segment in the text by applying the text to a trained computational model. The score corresponds to a predicted relevance of the respective segment to a narrative of the media content item. The instructions further cause the server system to identify a non-narrative segment within the text using the assigned scores.

Thus, systems are provided with improved methods for detecting (e.g., identifying) non-narrative segments in texts.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 4F-4G illustrate an example of a text, a clean text, and a media content item description, in accordance with some embodiments.

FIGS. 6A-6B are flow diagrams illustrating a method of identifying non-narrative segments in a text, in accordance with some embodiments.

DETAILED DESCRIPTION

Figure 1:
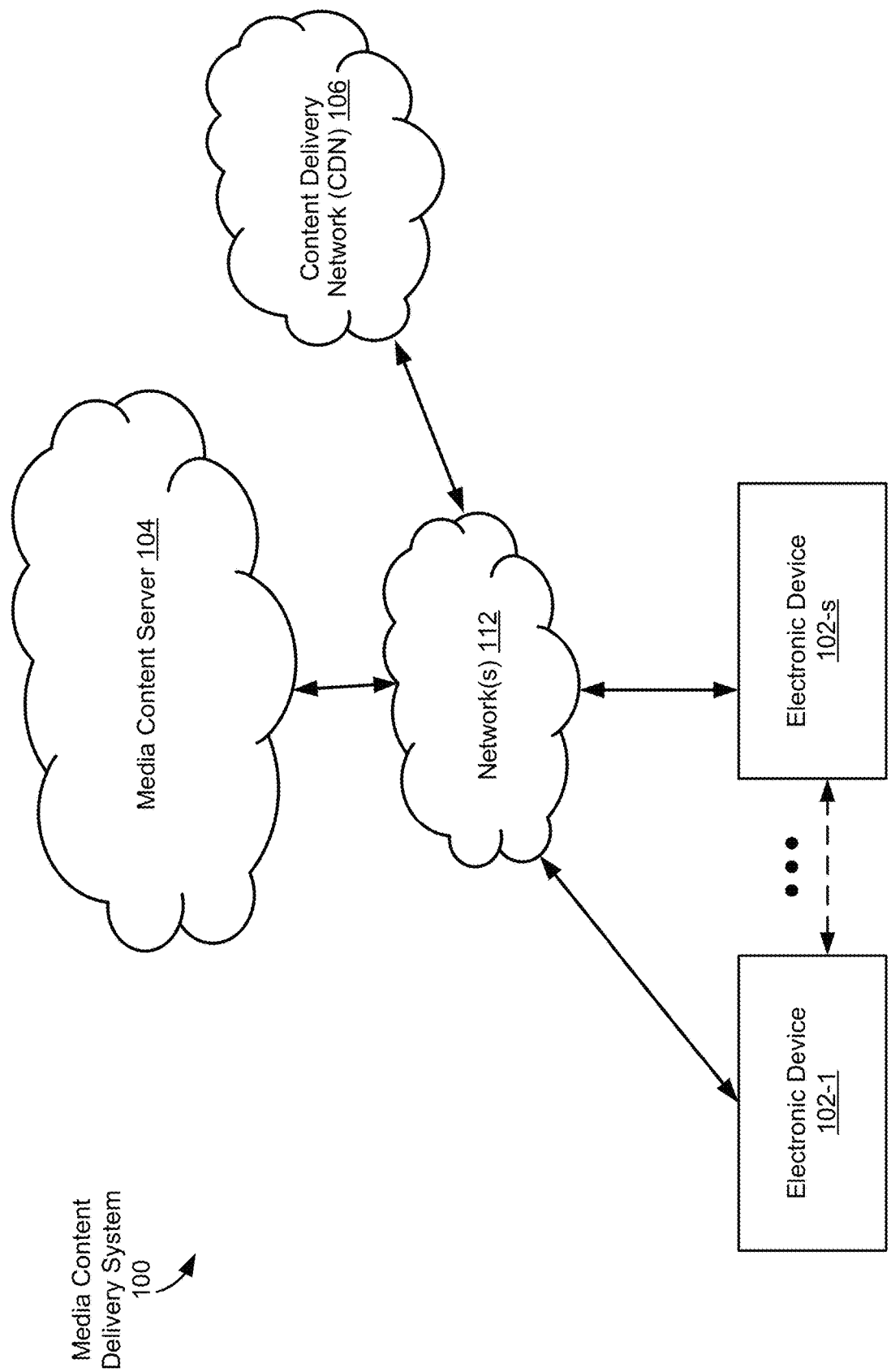
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described embodiments. The first set of parameters and the second set of parameters are both sets of parameters, but they are not the same set of parameters.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Podcasts are a rich source of data for speech and natural language processing NLP). Two types of textual information associated with a podcast episode are (1) the short description written by the podcast creator, and (2) the transcript of its audio content, both of which may contain content that is not directly related to the main themes of the podcasts. Such content may come in the form of sponsor advertisements, promotions of other podcasts, or mentions of the speakers' websites and products. While such content is tightly integrated into the user experience and monetization, it is a source of noise for NLP applications which utilize podcast data. For example, an episode of the podcast show may include a promotion for an unrelated podcast about dogs; a search query for podcasts on dogs should probably not surface the episode. Algorithms attempting to connect topics discussed in the podcast to those mentioned in the episode description, such as summarization models, would be confounded by the presence of supplementary material and uniform resource locators (URLs) in the description. Information extraction models looking for entities may mistakenly retrieve sponsor names from advertisements.

The systems and method described herein alleviate the problem of detecting non-topical content in, e.g., episode descriptions and audio transcripts. To that end, the systems and methods described herein used computation models (trained on an annotated corpus) to detect non-topical content.

FIG. 1 is a block diagram illustrating a media content delivery system for a media providing service, in accordance with some embodiments. The media content providing system 100 includes one or more electronic devices 102 (e.g., electronic device 102-1 to electronic device 102-s, where s is an integer greater than one), one or more media content servers 104, and/or one or more content delivery networks (CDNs) 106. The one or more media content servers 104 are associated with (e.g., at least partially compose) a media providing service. The one or more CDNs 106 store and/or provide one or more content items (e.g., to electronic devices 102). In some embodiments, the one or more CDNs 106 are associated with the media providing service. In some embodiments, the CDNs 106 are included in the media content servers 104. One or more networks 112 communicably couple the components of the media content providing system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-s are the same type of device (e.g., electronic device 102-1 and electronic device 102-s are both speakers). Alternatively, electronic device 102-1 and electronic device 102-s include two or more different types of devices.

In some embodiments, electronic devices 102-1 and 102-*s* send and receive media-control information through network(s) 112. For example, electronic devices 102-1 and 102-*s* send media control requests (e.g., requests to play music, movies, videos, or other media items, or playlists thereof) to media content server 104 through network(s) 112. Additionally, electronic devices 102-1 and 102-*s*, in some embodiments, also send indications of media content items to media content server 104 through network(s) 112. In some embodiments, the media content items are uploaded to electronic devices 102-1 and 102-*s* before the electronic devices forward the media content items to media content server 104.

In some embodiments, electronic device 102-1 communicates directly with electronic device 102-*s* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*s*. In some embodiments, electronic device 102-1 communicates with electronic device 102-*s* through network(s) 112. In some embodiments, electronic device 102-1 uses the direct connection with electronic device 102-*s* to stream content (e.g., data for media items) for playback on the electronic device 102-*s*.

In some embodiments, electronic device 102-1 and/or electronic device 102-*s* include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 provides media content items to electronic devices 102-*s* (e.g., users) of the media providing service. In some embodiments, media content server 104 and/or CDN 106 stores one or more playlists (e.g., information indicating a set of media content items). For example, a playlist is a set of media content items defined by a user and/or defined by an editor associated with a media providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
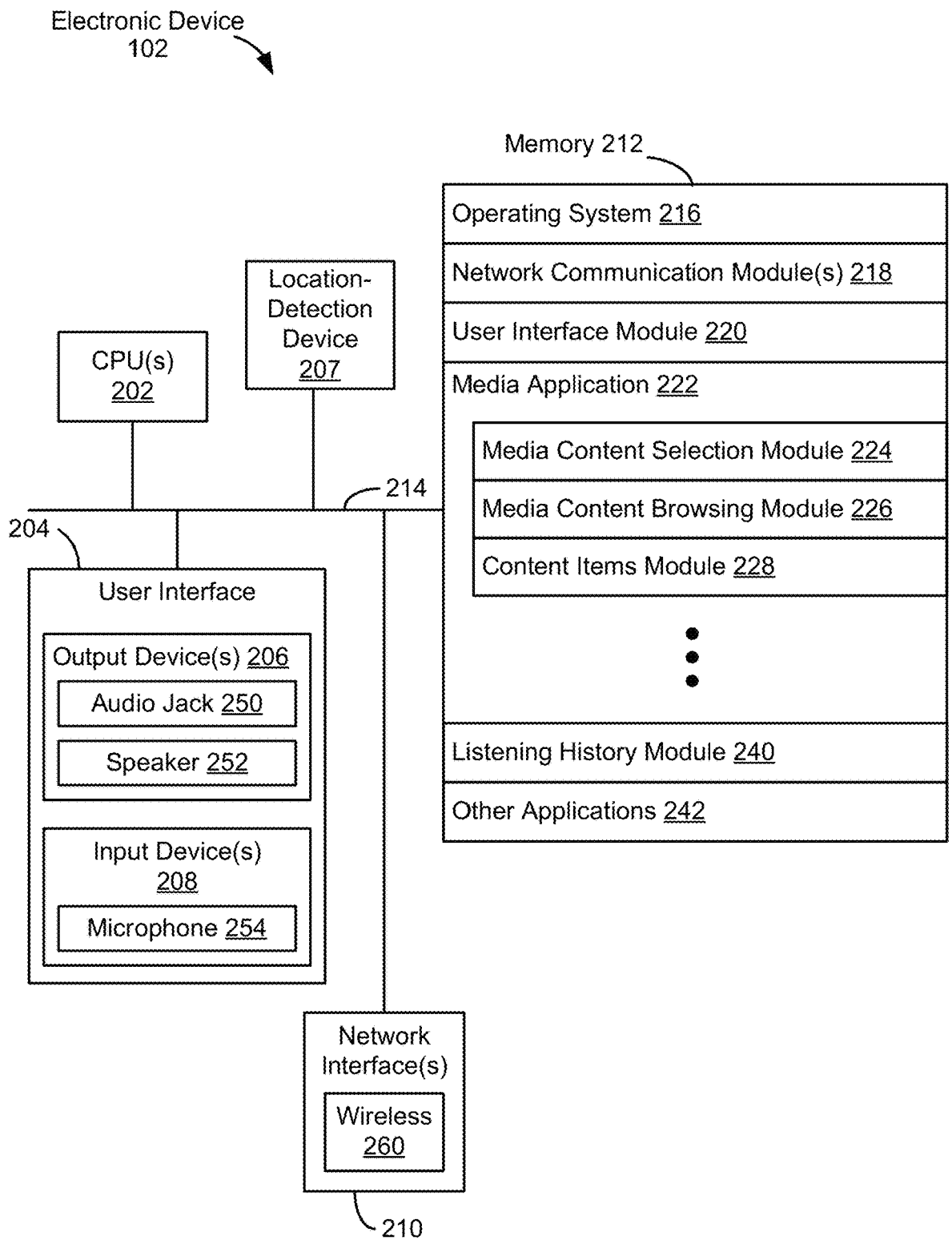
FIG. 2 is a block diagram illustrating a client device, in accordance with some embodiments.

FIG. 2 is a block diagram illustrating an electronic device 102 (e.g., electronic device 102-1 and/or electronic device 102-*s*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 207, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:
- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely; and
  - a content items module 228 for storing media items for playback at the electronic device;
- a listening history module 240 (sometimes referred to as a playback history module) for storing (e.g., as a list for each user) media content items that have been presented (e.g., streamed, provided, downloaded, played) to a respective user and/or analyzing playback patterns for one or more users; and
- other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
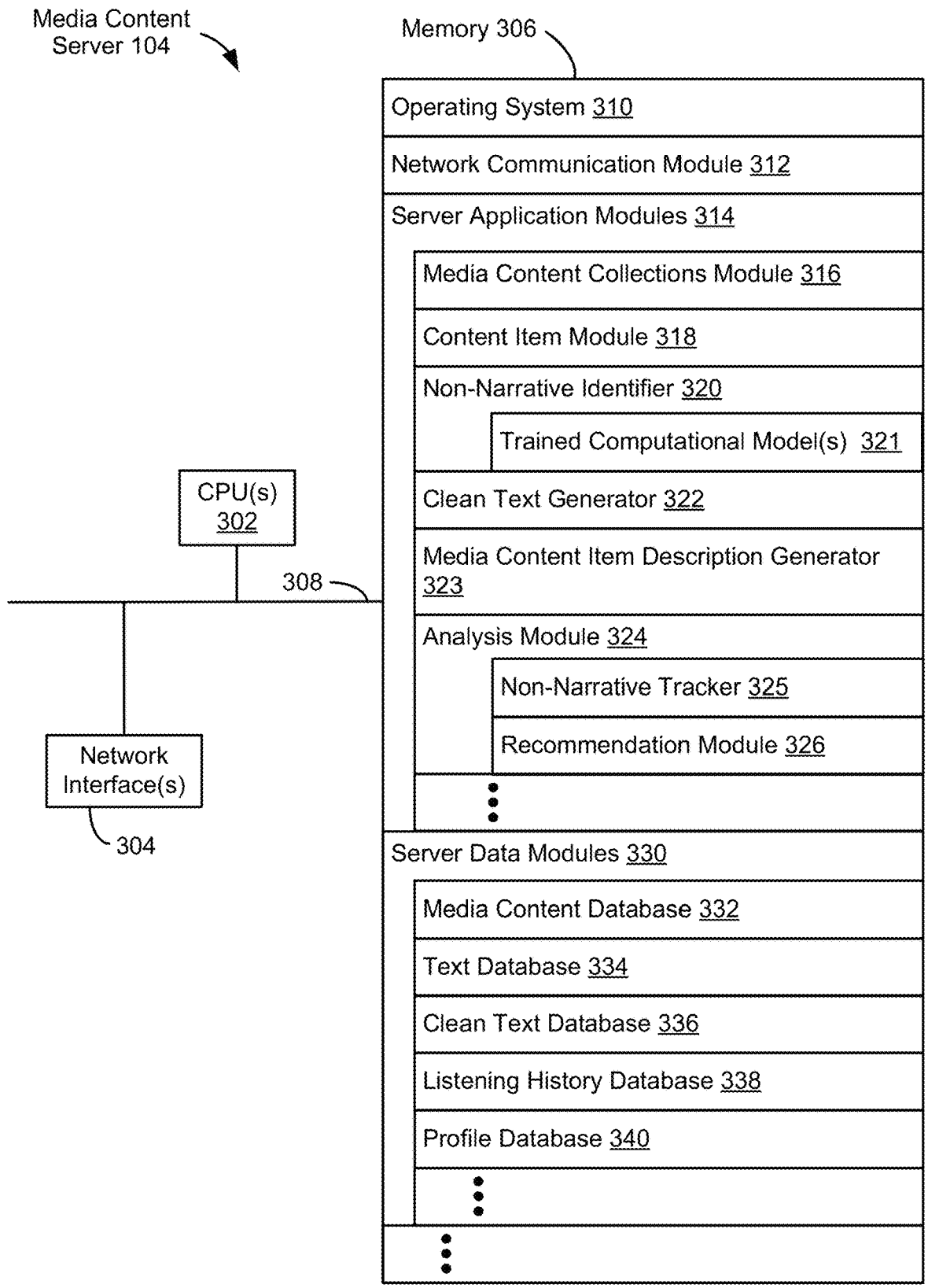
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory device, and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:
- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content collections module 316 for storing and/or creating (e.g., curating) media content collections, each media content collection associated with one or more descriptor terms (e.g., playlist titles and/or descriptions) and/or including one or more media content items;

a content item collection module 318 for collecting and storing media items for playback;

a non-narrative identifier 320 for identifying non-narrative segment(s) in text. The non-narrative identifier includes one or more trained computational models 321 (e.g., neural networks) that are trained to identify non-narrative segments in a text (e.g., segments in a text that are not part of a main narrative of a media content item associated with the text, segments in a text that are not topical to a narrative of a media content item associated with the text);

a clean text generator 322 for generating a clean text based on non-narrative segment(s) in a text that have been identified by the non-narrative identifier 320;

a media content item description generator 323 for generating a description (e.g., a descriptive text, a summary, an overview) for a media content item based on clean text associated with the media content item (e.g., where clean text refers to text in which the non-narrative segments have been removed); and an analysis module 324 for performing analysis. The analysis module includes: (i) a non-narrative tracker 325 for analyzing and displaying statistics regarding non-narrative content in media content items provided by the media providing service and (ii) a recommendation module 326 for generating recommendations for users (e.g., subscribers, users associated with a user profile) of the media providing service. For example, the recommendation module 326 may generate one or more recommendations (e.g., recommend one or more media content items) for a user; and one or more server data module(s) 330 for handling the storage of and/or access to media items and/or metadata relating to the media items. In some embodiments, the one or more server data module(s) 330 include:

a media content database 332 for storing media content items;

a text database 334 for storing texts (e.g., transcripts, summaries, descriptions) that correspond to (e.g., are associated with) media content items;

a clean text database 336 for storing clean texts generated by clean text generator 322. A clean text is generated based on a text and identified non-narrative segments in the text. The text and the clean text are each associated with a media content item that is provided by the media providing service;

a listening history database 338 (also referred to as a playback history database) for storing (e.g., as a list for each user) media content items that have been consumed (e.g., streamed, listened, viewed) by a respective user as well as storing listener retention information for media content items played by a respective user; and a profile database 340 for storing user profiles (e.g., user information) of users of the media providing service.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
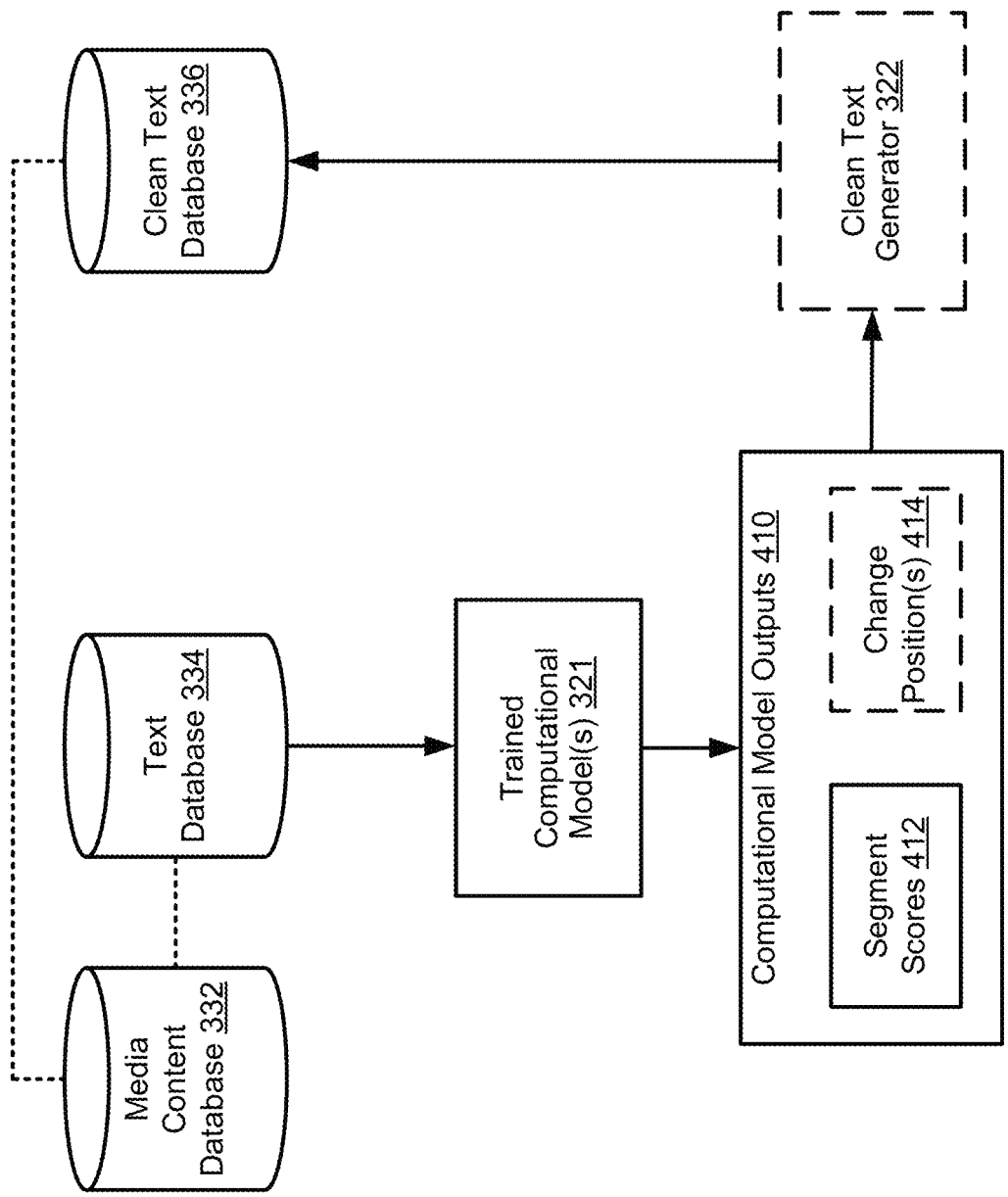
FIGS. 4A-4B illustrate identifying non-narrative segments in text that is associated with a media content item, in accordance with some embodiments.
Figure 4B:
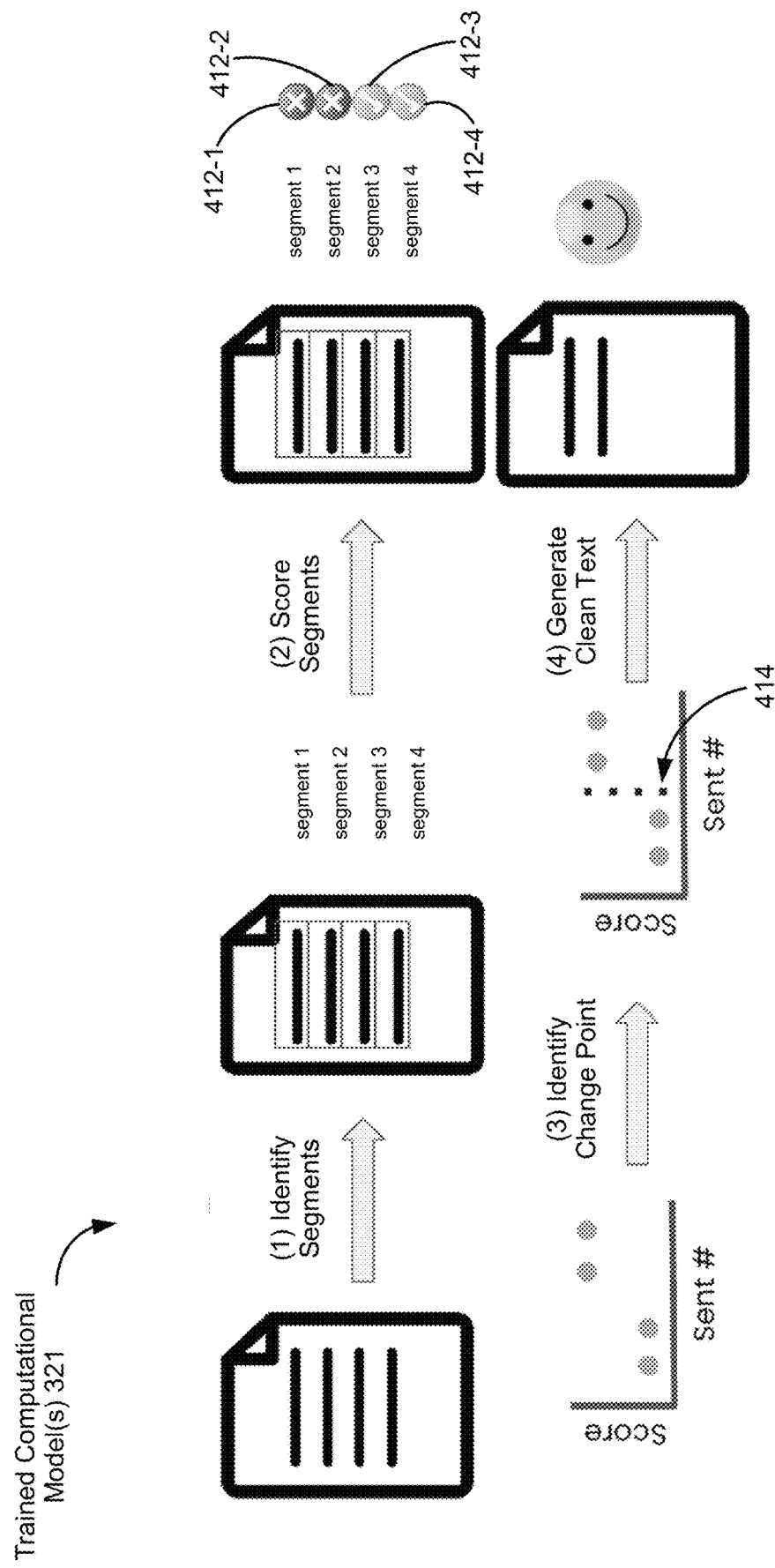

FIGS. 4A-4B illustrate identifying non-narrative segment(s) in a text that is associated with (e.g., that corresponds to) a media content item that is provided by a media providing service, in accordance with some embodiments. For example, the text may be a transcript of audio from the media content item. In another example, the text may be a description (e.g., summary) that includes information regarding the topic(s) covered by the media content item (e.g., discussed in the audio of the media content item). For example, the text may be a transcript of an episode of a podcast or a description (e.g., summary) of a podcast episode. In some embodiments, the text is stored in a text database 334. In some embodiments, the media content item associated with the text is stored in a media content database 332.

In some embodiments, a text associated with a media content item (such as a transcript of a podcast episode or a description of a podcast) may include information that is not part of a narrative (e.g., a main narrative) of the media content item (e.g., not topical to the content of the media content item). For example, when the text is a transcript of a podcast episode, if the podcast episode includes additional segments (e.g., a "listener mail" segment, a musical interlude segment), the text includes one or more segments that correspond to such additional content in the podcast episode that is not part of the narrative of the podcast episode (e.g., not related to, non-topical to, not relevant to the topic(s) covered in the podcast episode). In another example, when the text is a transcript of a podcast episode, if the podcast episode includes one or more promotional offers (e.g., advertisements), the text includes one or more segments that correspond to the one or more promotional offers that are not part of a narrative of the podcast episode (e.g., not related to, non-topical to, not relevant to the topic(s) covered in the podcast episode). In such cases, it may be desirable to identify non-narrative segments in the text that is associated with the media content item so that any analysis or decision making can focus on portions of the text that are relevant to the main narrative of the media content item (e.g., informative regarding topic(s) covered in the media content item, indicative of the narrative of the media content item, accurately representative of the narrative of the media content item).

One or more trained computational models 321 are applied to the text in order to identify non-narrative segments (e.g., non-narrative sentences, sentences that are not relevant to a main narrative of the media content item) in the text. The one or more trained computational models 321 are configured to identify non-narrative segments (e.g., non-narrative sentences) in the text. The one or more trained computational models 321 provide outputs 410 for the text, including segment scores 412 for segments (e.g., sentences) of the text. In some embodiments, the computational model outputs 410 include a segment score 412 for each segment (e.g., sentence) in the text (e.g., segment-level scores, sentence-level scores). In some embodiments, the computational model outputs 410 also include one or more change positions 414 in the text. Details regarding how the one or more trained computational models 321 identify non-narrative segments in the text are provided with respect to FIG. 4B.

A clean text is generated based on the text and the computational outputs 410. In some embodiments, the one or more trained computational models 321 are configured to generate the clean text. In some embodiments, the computational model outputs 410 are provided to the clean text generator 322 (e.g., the clean text generator 322 receives the computational model outputs 410), and the clean text generator 322 is configured to generate a clean text based on the text and the computational outputs 410. The generated clean text is associated with the media content item (e.g., associated with the same media content item with which the text is associated). In some embodiments, the clean text is stored in a clean text database 336.

In contrast to the text (e.g., the text to which the one or more computational models 312 are applied, the initial text, the original text), which may include non-narrative segments, the clean text does not include at least one of the identified non-narrative segments. For example, when the text includes a non-narrative segment (e.g., when at least one non-narrative segment is identified in the text), the non-narrative segment is removed from the text in order to generate the clean text. Thus, the number of non-narrative segments in the clean text is reduced (e.g., smaller, lower) relative to the number of non-narrative segments in the text. In some embodiments, the cleaned text does not include any of the non-narrative segments that are identified by the one or more computational models 321. In some embodiments, the clean text is generated by removing at least one of the identified non-narrative segments from the text. For example, any of the one or more computational models 321 and the clean text generator 322 may reconstruct a new paragraph based on the segments in the text (e.g., use segments or sentences in the original text) in order to generate the clean text.

In some embodiments, the clean text is stored in a clean text database 336. In some embodiments, the clean text is used in analytics that are performed as part of operations of the media providing service, details of which are provided with respect to FIG. 4C.

FIG. 4B illustrates details regarding how the one or more trained computational models 321 identifies non-narrative segments (e.g., non-topic segments, non-narrative sentences) in a text. The one or more trained computational models 321 begin by (step 1) identifying segments (e.g., sentences) in the text. For example, the one or more trained computational models 321 break up words in the text into segments. In some embodiments, the words are separated (e.g., divided up) on a sentence-level (e.g., sentence by sentence, based on punctuation). In such cases, the one or more trained computational models 321 identify sentences in the text and break the text up into sentences such that each sentence corresponds to (e.g., is) a segment of the text. In step 2, the one or more trained computational models 321 score each of the identified segments. In the example shown in FIG. 4B, the one or more trained computational models 321 assign scores 412-1 and 412-2 to segment 1 and segment 2, respectively, and scores 412-1 and 412-2 provide an indication that segments 1 and 2 are not non-narrative segments. In contrast, the one or more trained computational models 321 assign scores 412-3 and 412-4 to segment 3 and segment 4, respectively, and scores 412-3 and 412-4 provide an indication that segments 3 and 4 are identified as non-narrative segments. In some embodiments, in step 3, the one or more trained computational models 321 also identify a change position 414 (e.g., change point, change location) within the text. The change position 414 corresponds to a point in the text in which consecutive segments (e.g., adjacent segments, consecutive sentences) have different scores. In this example, the change position 414 is identified as being between segment 2 and segment 3 (since segment 2 is assigned a different score from segment 3). In step 4, a clean text is generated based on the text input into the one or more trained computational models 321 and the segment scores. In some embodiments, the clean text is also generated based on the identified change position 414. In some embodiments, the one or more trained computational models 321 generate the clean text. In some embodiments, computational model outputs 410 are transmitted to the clean text generator 322, which uses the text and the computational model outputs 410 to generate the clean text.

Figure 4C:
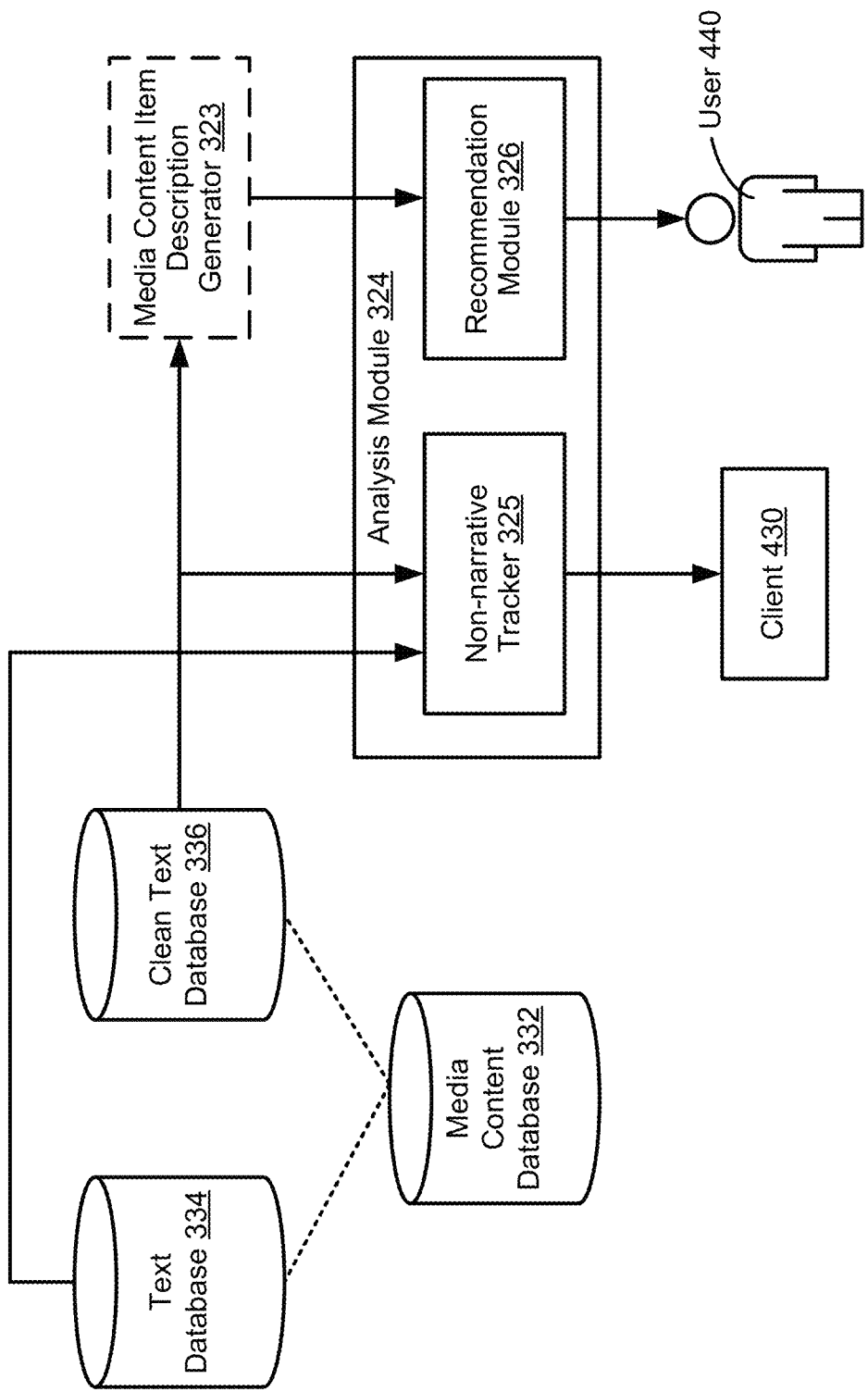
FIG. 4C illustrates using clean text, e.g., to generate a recommendation for a media content item, in accordance with some embodiments.

FIG. 4C illustrates using a clean text, in accordance with some embodiments. Since the clean text is generated based on the text (e.g., the original text) associated with (e.g., corresponding to) the media content item and the identified non-narrative segments in the text, the clean text is also associated with the media content item (e.g., the clean text is associated with the same media content item with which the text is associated). In some embodiments, the clean text is provided to an analysis module 324, which includes a non-narrative tracker 325 and a recommendation module 326.

In some embodiments, information regarding the text and/or the associated clean text is provided to the non-narrative tracker 325 so that the non-narrative tracker can generate data (e.g., information and/or statistics) regarding whether or not the media content item associated with the text and the clean text (e.g., the original text associated with the media content item) includes non-narrative segments. In some embodiments, the non-narrative tracker 325 may be able to discern which media content items and/or corresponding text includes promotional offers. In some embodiments, the non-narrative tracker can analyze information regarding which media content items include non-narrative content and generate one or more metrics that can be used internally or provided to a client 430 of the media content providing system 100 (e.g., a producer that produces media content items for distribution through the media content providing system 100).

In some embodiments, the clean text is provided to the recommendation module 326 so that the recommendation module 326 can use the clean text in providing recommendations to users 440 of the media content providing system 100. For example, when the text and the clean text include (e.g., are, correspond to) a description (e.g., summary, overview) of a media content item, the recommendation module 326 may use the clean text to generate or look for keywords that are representative of (e.g., indicative of) the topic or content of the media content item associated with the clean text. For example, when generating recommendations for a user 440 of the media providing service (e.g., a subscriber of the media providing service), the recommendation module 326 may compare one or more keywords corresponding to media content items that the user frequently views or is subscribed to, and query clean versions of podcast descriptions (or podcast episode descriptions) for similar words or related keywords in order to provide the user 440 with recommendations (e.g., recommendations of media content item(s)).

In some embodiments, the clean text is transmitted to a media content item description generator 323 (e.g., the media content item description generator 323 receives the clean text), and the media content item description generator 323 is configured to generate a description associated with (e.g., corresponding to) the media content item based on the clean text. For example, when the clean text is a transcript of audio of an media content item (e.g., transcription of a podcast episode), the media content item description generator 323 uses the clean transcript of the media content item to generate a description (e.g., summary, overview) of the media content item. The generated description is transmitted to the recommendation module 326 (e.g., the recommendation module 326 receives the description that is generated based on the clean text) and uses the description in providing recommendations to users 440 of the media content providing system 100.

Figure 4D:
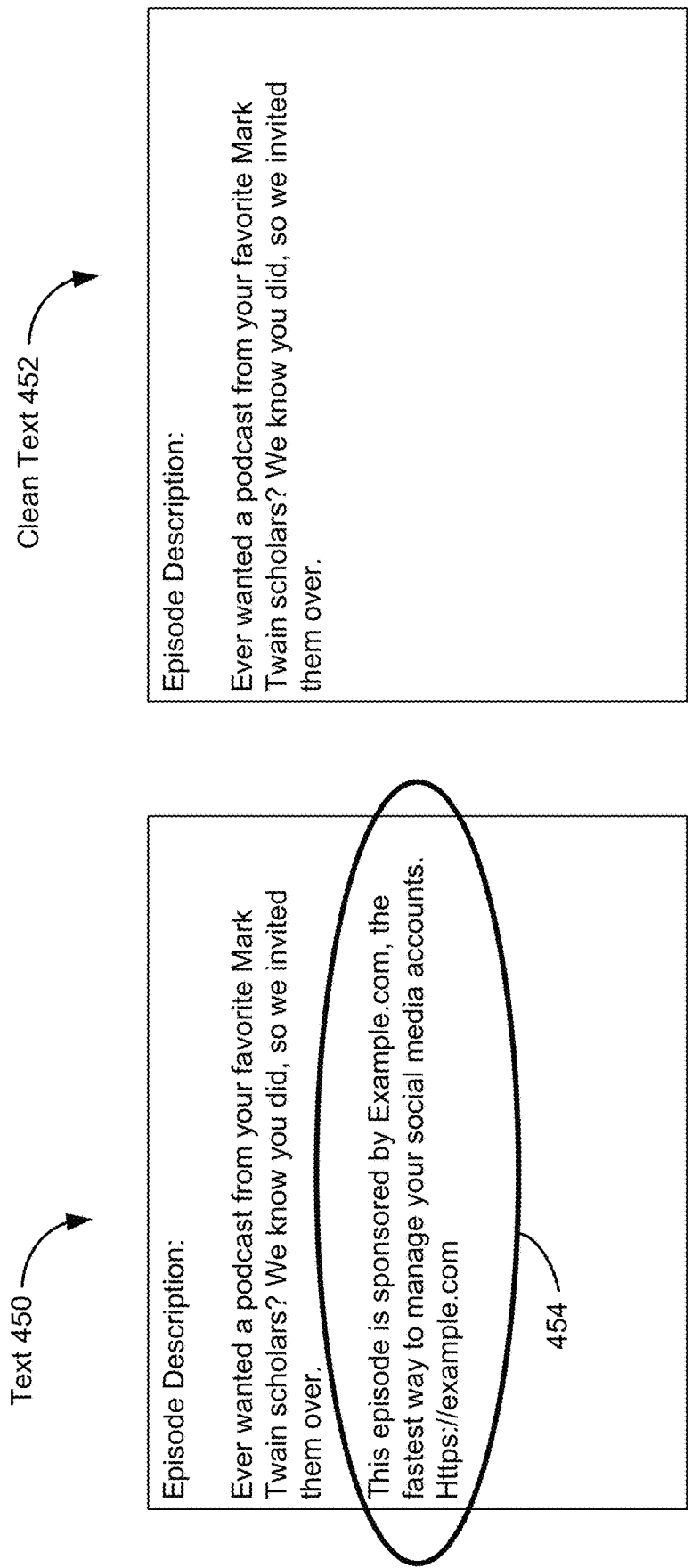
FIGS. 4D-4E illustrate examples of texts and clean texts that are generated based on identified non-narrative segments in the text, in accordance with some embodiments.
Figure 4E:
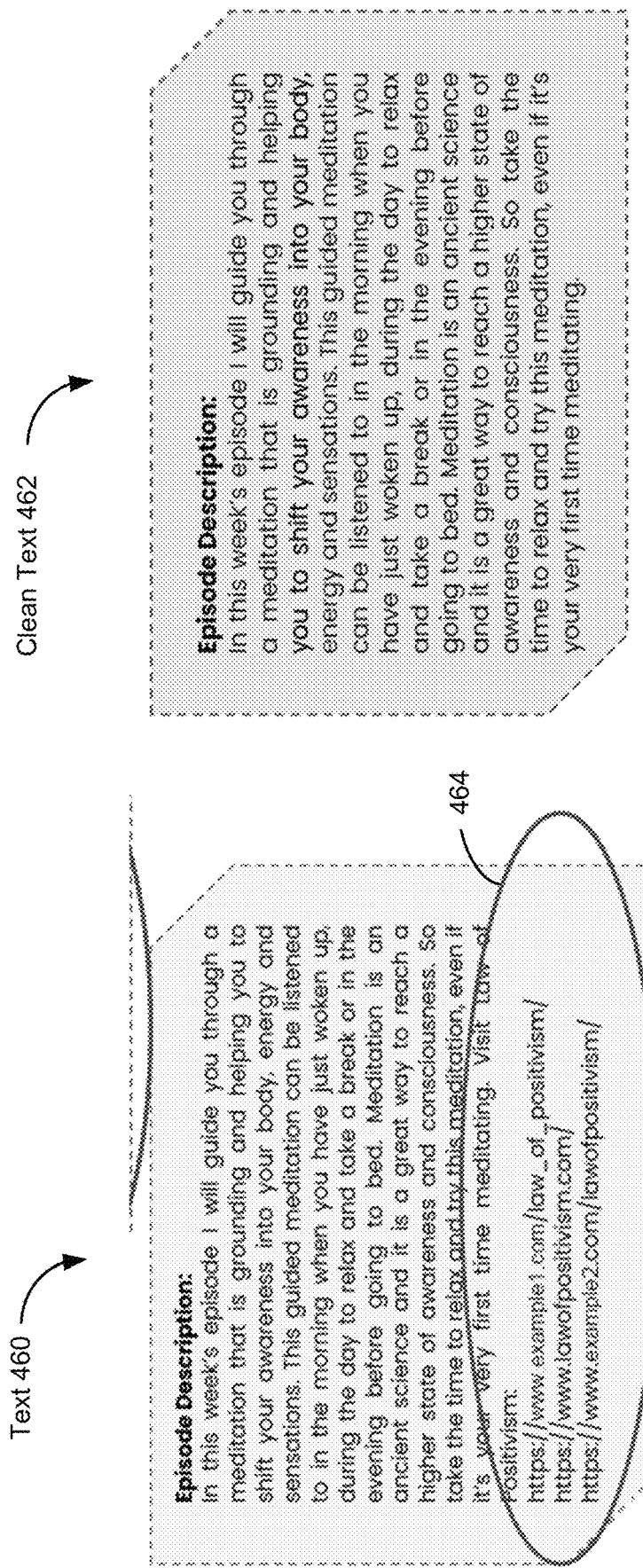

FIGS. 4D-4E illustrate examples of texts and clean texts that are generated based on identified non-narrative segments in the text, in accordance with some embodiments.

FIG. 4D shows an example of a text 450 (e.g., an initial text) that includes one or more non-narrative segments 454. The one or more computational models 321 are applied to the text 450 in order to identify one or more non-narrative segments 454 that are included in the text 450. FIG. 4D also shows an example of a clean text 452 that is generated based on the text 450 and the identified non-narrative segment(s) 454. The text 450 is associated with (e.g., corresponds to) a media content item. In this example, the media content item is a podcast episode and the text 450 is a description of the podcast episode. Thus, the clean text 452 is also associated with (e.g., also corresponds to) the same media content item as text 450 (e.g., clean text 452 is associated with the same podcast episode as text 450, the clean text 452 is a clean description of the podcast episode). For example, the clean text 452 may omit (e.g., does not include) promotional offers or promotional information, such as an advertisement for a podcast provider, or a website or profile corresponding to the hosts of the podcast or a guest on the podcast.

FIG. 4E shows an example of a text 460 (e.g., an initial text) that includes at least one non-narrative segment 464. The one or more computational models 321 are applied to the text 460 in order to identify the non-narrative segment(s) 464 in the text 460. FIG. 4E also shows an example of a clean text 462 that is generated based on the text 460 and the identified non-narrative segment(s) 464. The text 460 is associated with (e.g., corresponds to) a media content item. In this this example, the media content item is a podcast episode and the text 460 is a description of the podcast episode. Thus, the clean text 462 is also associated with (e.g., also corresponds to) the same media content item as text 450 (e.g., clean text 462 is associated with the same podcast episode as text 460, the clean text 452 is a clean description of the podcast episode).

FIGS. 4F-4G illustrate an example of a text 470, a clean text 472, and a media content item description 476, in accordance with some embodiments.

FIG. 4F shows an example of a text 470 (e.g., an initial text) that includes non-narrative segments 474. The one or more computational models 321 are applied to the text 470 in order to identify the non-narrative segments 474 that are included in the text 470. FIG. 4E also shows an example of a clean text 472 that is generated based on the text 470 and the identified non-narrative segments 474. The text 470 is associated with (e.g., corresponds to) a media content item. In this example, the media content item is a podcast episode and the text is a transcript of the podcast episode. Thus, the clean text 472 is also associated with (e.g., also corresponds to) the same media content item as text 470 (e.g., clean text 472 is associated with the same podcast episode as text 470, clean text is a transcript of the podcast episode).

FIG. 4G shows an example of a description 476 (e.g., a media content item description) that is generated based on the clean text 472 (shown in FIG. 4F). In some embodiments, the description 476 is generated by the one or more trained computational models 321 (e.g., is output from or provided as part of an output from the one or more trained computational models 321). In some embodiments, the description 476 is generated by the clean text generator 322 (described with respect to FIGS. 3 and 4A). In some embodiments, the description 476 is distinct from (e.g., different from) each of the text 470 and the clean text 472. In some embodiments, the description 476 includes at least one sentence that is not included in either the text 470 or the clean text 472. In some embodiments, the description 476 differs from each of the text 470 and the clean text 472 by at least one sentence.

Figure 5A:
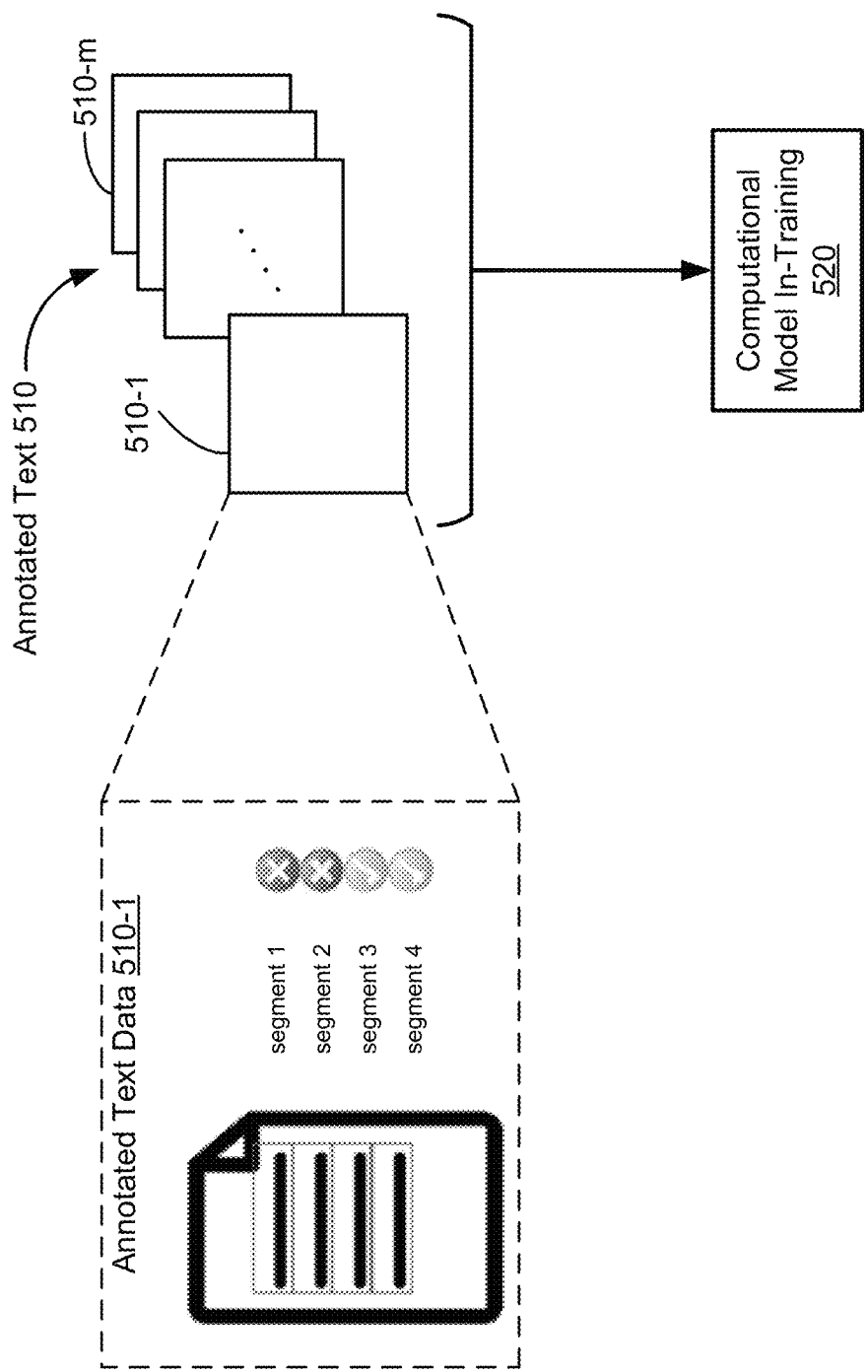
FIG. 5A illustrates training a computational model using annotated texts to identify non-narrative segments, in accordance with some embodiments.

FIG. 5A illustrates training the one or more computational models 321 using annotated texts 510, in accordance with some embodiments. The one or more computational models in-training 520 correspond to the one or more computational model 321 during their training stage. In order to train the one or more computational models 321 to predict which segments in a text are non-narrative segments, the one or more computational models 321 are trained using a plurality of annotated texts 510. The plurality of annotated texts 510 are provided to the one or more computational models in-training 520. Each annotated text (e.g., annotated text 510-1 through 510-$m$) of the plurality of annotated texts 510 includes: (i) text corresponding to (e.g., associated with) audio from a media content item of a plurality of media content items that are provided by the media content providing system 100, and (ii) a plurality of annotations. The plurality of annotations includes an annotation for (e.g., associated with, corresponding to) each segment in the text. Each annotation provides an indication regarding whether or not the segment associated with the annotation is considered to be a non-narrative segment. In some embodiments, the annotations are provided by one or more humans. Each of the plurality of annotated texts 510 includes at least one non-narrative segment. In some embodiments, in order to identify texts to be annotated and included in the plurality of annotated texts 510, a different method of identifying non-narrative content in a media content item may be used. For example, retention graphs corresponding to media content item may be used to determine whether a media content item includes non-narrative content (including promotional offers and non-topical portions of the media content item), and in response to a determination that the media content item includes non-narrative content, text corresponding to the media content item (e.g., a transcript or description of the media content item) may be annotated and included as one of the plurality of annotated texts 510. Details regarding the use of retention graphs for identifying non-narrative content is provided in U.S. patent application Ser. No. 17/076,457 entitled "Systems and Methods for Skip-based Content Detection" filed on Oct. 21, 2020, which is incorporated herein in its entirety.

In some embodiments, the plurality of texts that are included in the annotated texts and the associated plurality of media content items are distinct (e.g., different) from the text provided to the one or more trained computational models 321 when using the one or more trained computational models 321 to identify non-narrative segments.

Figure 5B:
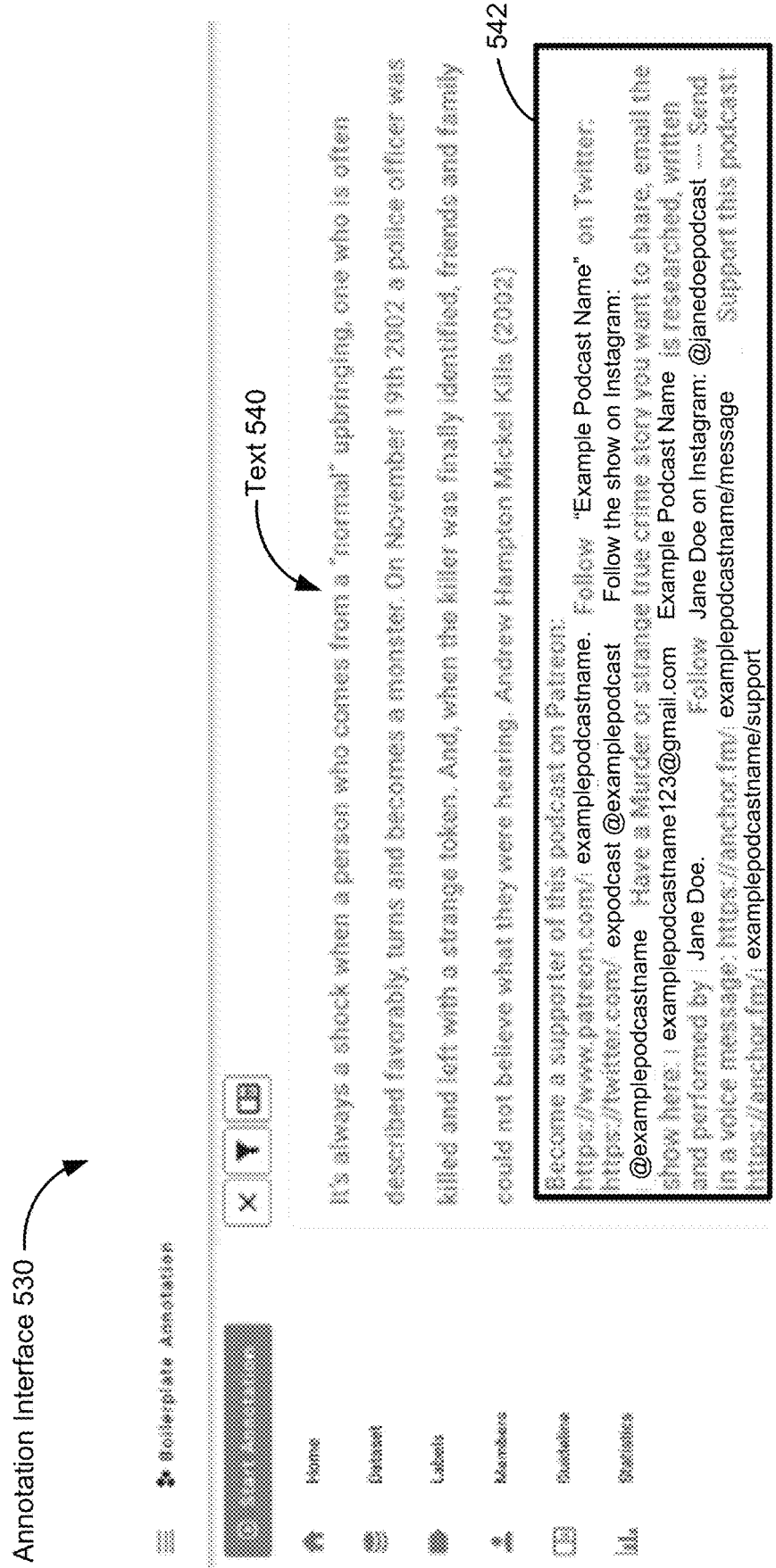
FIG. 5B illustrates an example interface for generating annotated texts, in accordance with some embodiments.

FIG. 5B illustrates an example annotation interface 530 for generating annotated texts 510, in accordance with some embodiments. FIG. 5B shows an annotation interface 530 that displays text 540 corresponding to a media content item. In this example, the text is a description of a podcast episode. A user of the annotation interface 530 is able to add annotations to the text. In this example, the user determines that the text 540 includes non-narrative segments (shown in the box 542). Thus, the user can provide annotations for each segment (e.g., each sentence) in the text 540 to indicate that segments included in the box 542 are identified as non-narrative segments and that segments outside of the box 542 are not identified as non-narrative segments. Once annotations to the text are completed, the annotated text 510 can be applied to the one or more computational models in-training 520 for training (e.g., generating) the one or more trained computational models 321.

Figure 6B:
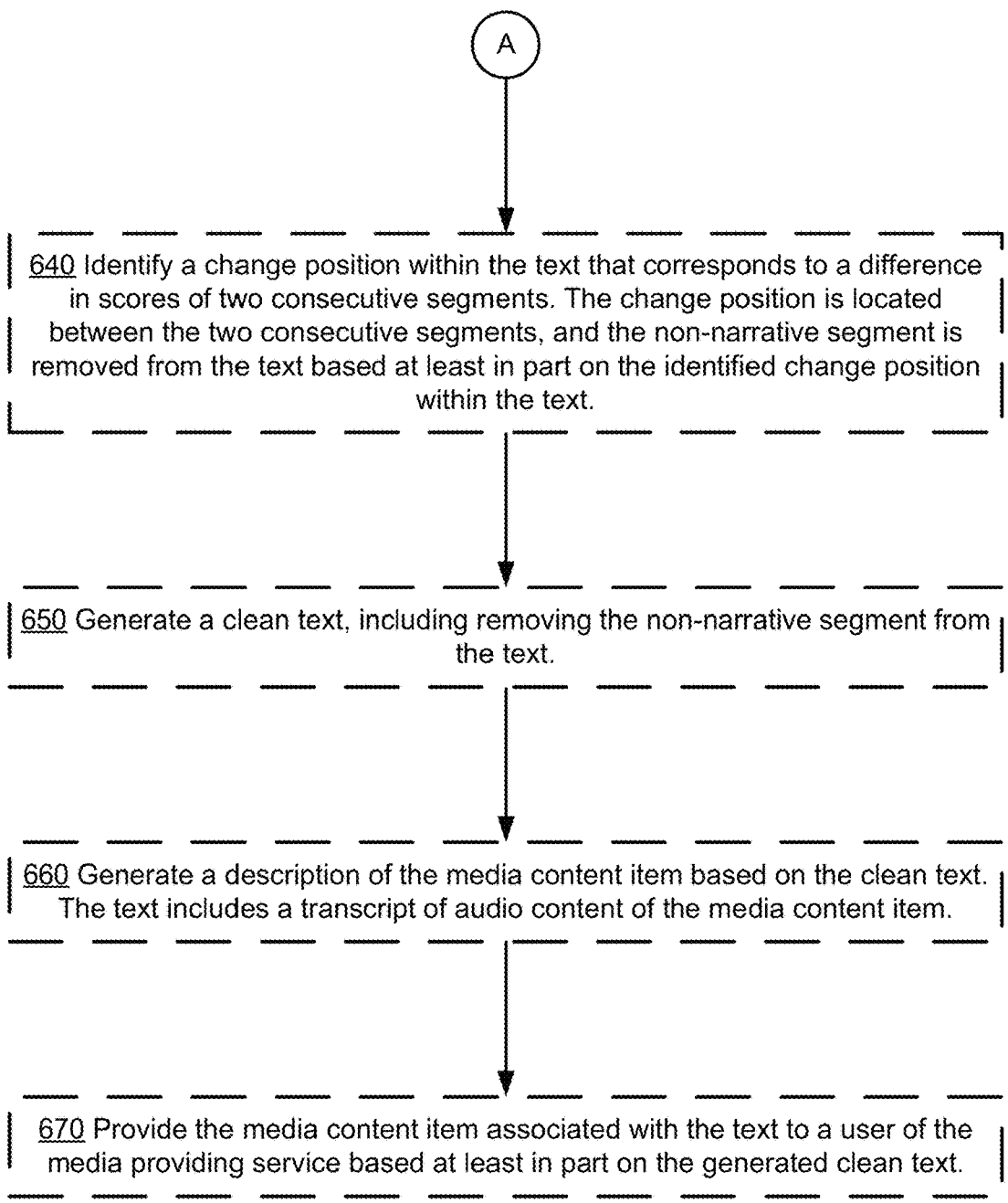

FIGS. 6A-6B are flow diagrams illustrating a method 600 of identifying non-narrative segments in a text, in accordance with some embodiments. Method 600 may be performed at an electronic device (e.g., media content server 104) having one or more processors and memory storing instructions for execution by the one or more processors. In some embodiments, the method 600 is performed by executing instructions stored in the memory (e.g., memory 306, FIG. 3) of the electronic device. In performing the method 600, the electronic device (e.g., media content server 104) retrieves (610) a text (e.g., text 450, 460, 470) from a database (e.g., text database 334). The text corresponds to audio from a media content item that is provided by a media providing service (e.g., media content providing system 100), and the text includes a plurality of segments (e.g., segments 1 through segment 4, sentences). The electronic device assigns (620) a score 412 (e.g., scores 412-1 to 412-4) for each segment in the text by applying the text to a trained computational model 321 (e.g., one or more trained computational models 321). The score corresponds to a predicted relevance of the respective segment to a narrative of the media content item. The electronic device identifies (630) a non-narrative segment from the text using the assigned scores. For example, as shown in FIG. 4B, the one or more trained computational models 321 assign a score 412 to each segment in the text. As shown, score 412-1 is assigned to segment 1, score 412-2 is assigned to segment 2, score 412-3 is assigned to segment 3, and score 412-4 is assigned to segment 4. Scores 412-1 and 412-2 indicate that segments 1 and 2 are not identified as non-narrative segments and score 412-3 and 412-4 indicate that segments 3 and 4 are identified as being non-narrative segments.

In some embodiments, the computation model is a BERT (bidirectional encoder representations from transforms) model. In some embodiments, to score a respective segment, both the respective segment and an adjacent segment (e.g., the preceding segment) are input to the computational model.

In some embodiments, segments are scored individually by the computational model, but a determination as to whether the content is topical (e.g., narrative) or non-topical is performed using contiguous blocks of segments. For example, if a respective segment is scored (e.g., classified) as non-topical, but each adjacent segment is scored as topical, the respective segment will be considered topical. In some embodiments, content is considered non-topical only when a predefined number of contiguous segments are classified as non-topical.

In some embodiments, the text is a transcript of audio from a media content item. In some embodiments, the text is a description or summary of a media content item.

In some embodiments, the one or more trained computational models 321 are trained (621) on a plurality of annotated texts 510. Each of the annotated text (e.g., annotated text 510-1 to 510-m) in the plurality of annotated texts 510 includes text corresponding to audio from a media content item of a plurality of media content items and a plurality of annotations.

In some embodiments, the plurality of annotated texts 510 are provided by the media providing service.

In some embodiments, each annotated text of the plurality of annotated texts 510 includes (622) an annotation for each segment in the text corresponding to audio from a media content item of the plurality of media content items.

In some embodiments, the electronic device generates (623) a label for each segment in the respective annotated text based on at least a portion of the plurality of annotations (e.g., each segment or each sentence is associated with an annotation). For example, the electronic device may generate a sentence-level annotation (e.g., sentence-level label) for a segment (e.g., sentence) based on annotation associated with the segment.

In some embodiments, assigning a score for a segment in the text (e.g., text 450, 460, 470) includes (624) analyzing content of the segment.

In some embodiments, assigning a score for a segment in the text (e.g., text 450, 460, 470) includes (625) analyzing content of the segment and analyzing content of a segment preceding the segment.

In some embodiments, the electronic device identifies (640) one or more change positions 414 within the text that correspond to a difference in scores of two consecutive segments. The change position 414 is located between the two consecutive segments, and the non-narrative segment is removed from the text based at least in part on the identified change position 414 within the text. The example provided in FIG. 4B illustrates the location of change position 414 as being between segment 2 and segment 3. Segment 2 is identified as being part of the narrative of the text and segment 3 is identified as a non-narrative segment.

In some embodiments, the electronic device generates (650) a clean text (e.g., clean text 452, 462, 472), including removing the non-narrative segment from the text. In some embodiments, the clean text (e.g., text 452, 462, 472) includes fewer words than the text (e.g., the original text, the initial text; text 450, 460, 470). In some embodiments, the clean text (e.g., text 452, 462, 472) includes fewer sentences than the text (e.g., the original text, the initial text; text 450, 460, 470).

In some embodiments, the electronic device generates (660) a description (e.g., description 476) of the media content item based on the clean text. The text includes a transcript of audio content of the media content item. An example is provided with respect to FIGS. 4F and 4G. A generated description 476 is generated based on the clean text 472. The clean text 472 is a clean version of text 470, and the text 470 is a transcript of audio from a media content item. In some embodiments, the description includes fewer words and/or fewer sentences than the clean text.

In some embodiments, the electronic device provides (670) the media content item associated with the text to a user (e.g., user 440) of the media providing service based at least in part on the generated clean text (e.g., clean text 452, 462, 472). For example, the media content item may be provided as a recommendation to one or more users of the media providing service.

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
    retrieving, from a database, a text that corresponds to audio from a media content item that is provided by a media providing service, the text comprising a plurality of segments;
    assigning, by applying the text to a trained language model, a score for each segment in the text, wherein the score corresponds to a predicted relevance of the respective segment to a narrative of the media content item;
    identifying a change position within the text that corresponds to a difference in scores of two consecutive segments, wherein:
        the change position is located between the two consecutive segments;
        using the assigned scores, identifying a non-narrative segment within the text; and
    generating a clean text, including removing the non-narrative segment from the text based at least in part on the identified change position within the text.

2. The method of claim 1, wherein the text includes a transcript of audio content of the media content item, and the method further comprises:
    generating a description of the media content item based on the clean text.

3. The method of claim 1, further comprising:
    providing the media content item associated with the text to a user of the media providing service based at least in part on the generated clean text.

4. The method of claim 1, wherein:
    the trained language model is trained on a plurality of annotated texts; and
    each of the annotated texts in the plurality of annotated texts includes text corresponding to audio from a media content item of a plurality of media content items and a plurality of annotations.

5. The method of claim 4, wherein:
    each annotated text of the plurality of annotated texts includes an annotation for each segment in the text corresponding to audio from a media content item of the plurality of media content items.

6. The method of claim 4, further comprising:
    for a respective annotated text, generating a label for each segment in the respective annotated text based on at least a portion of the plurality of annotations.

7. The method of claim 1, wherein:
    assigning a score for a segment in the text includes analyzing content of the segment.

8. The method of claim 1, wherein:
    assigning a score for a segment in the text includes analyzing content of the segment and content of a segment preceding the segment.

9. An electronic device associated with a media providing service, comprising:
    one or more processors; and
    memory storing one or more programs, the one or more programs including instructions, which when executed by the one or more processors, cause the electronic device to perform a set of operations, comprising:
        retrieving, from a database, a text that corresponds to audio from a media content item that is provided by a media providing service, the text comprising a plurality of segments;
        assigning, by applying the text to a trained language model, a score for each segment in the text, wherein the score corresponds to a predicted relevance of the respective segment to a narrative of the media content item;
        identifying a change position within the text that corresponds to a difference in scores of two consecutive segments, wherein:
            the change position is located between the two consecutive segments;
            using the assigned scores, identifying a non-narrative segment within the text; and
        generating a clean text, including removing the non-narrative segment from the text based at least in part on the identified change position within the text.

10. The electronic device of claim 9, wherein the text includes a transcript of audio content of the media content item, and the set of operations further comprises:
    generating a description of the media content item based on the clean text.

11. The electronic device of claim 9, wherein the set of operations further comprises:
    providing the media content item associated with the text to a user of the media providing service based at least in part on the generated clean text.

12. The electronic device of claim 9, wherein:
    the trained language model is trained on a plurality of annotated texts; and
    each of the annotated texts in the plurality of annotated texts includes text corresponding to audio from a media content item of a plurality of media content items and a plurality of annotations.

13. The electronic device of claim 12, wherein:
    each annotated text of the plurality of annotated texts includes an annotation for each segment in the text corresponding to audio from a media content item of the plurality of media content items.

14. The electronic device of claim 12, further comprising:
    for a respective annotated text, generating a label for each segment in the respective annotated text based on at least a portion of the plurality of annotations.

15. The electronic device of claim 9, wherein:
    assigning a score for a segment in the text includes analyzing content of the segment.

16. A non-transitory computer-readable storage medium storing one or more programs configured for execution by an electronic device associated with a media providing service, the electronic device having one or more processors, the one or more programs including instructions, which when executed by the one or more processors, cause the electronic device to perform a set of operations, comprising:
    retrieving, from a database, a text that corresponds to audio from a media content item that is provided by a media providing service, the text comprising a plurality of segments;
    assigning, by applying the text to a trained language model, a score for each segment in the text, wherein the score corresponds to a predicted relevance of the respective segment to a narrative of the media content item;
    identifying a change position within the text that corresponds to a difference in scores of two consecutive segments, wherein:
        the change position is located between the two consecutive segments;
    using the assigned scores, identifying a non-narrative segment within the text; and
    generating a clean text, including removing the non-narrative segment from the text based at least in part on the identified change position within the text.

17. The non-transitory computer-readable storage medium of claim 16, wherein the text includes a transcript of audio content of the media content item, and the set of operations further comprises:
    generating a description of the media content item based on the clean text.

18. The non-transitory computer-readable storage medium of claim 16, wherein the set of operations further comprises:
    providing the media content item associated with the text to a user of the media providing service based at least in part on the generated clean text.

19. The non-transitory computer-readable storage medium of claim 16, wherein:
    the trained language model is trained on a plurality of annotated texts; and
    each of the annotated texts in the plurality of annotated texts includes text corresponding to audio from a media content item of a plurality of media content items and a plurality of annotations.

20. The non-transitory computer-readable storage medium of claim 19, wherein:
    each annotated text of the plurality of annotated texts includes an annotation for each segment in the text corresponding to audio from a media content item of the plurality of media content items.

* * * * *